Patented June 2, 1936

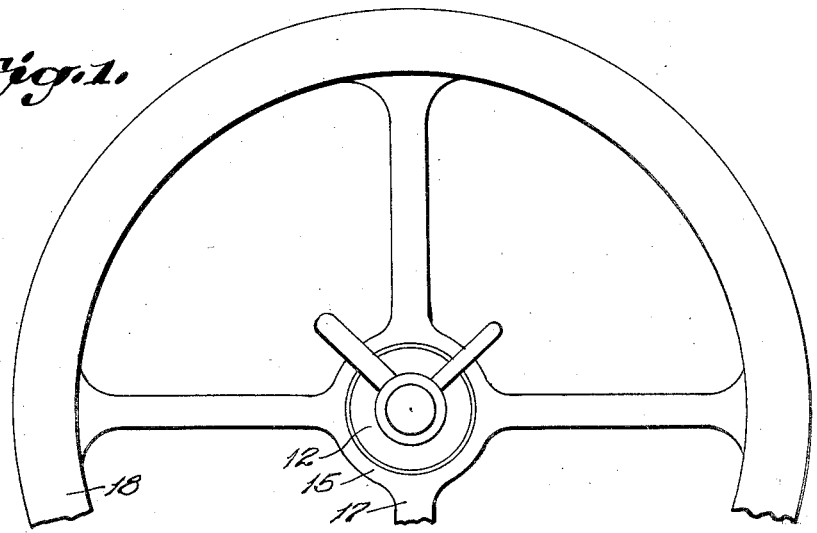
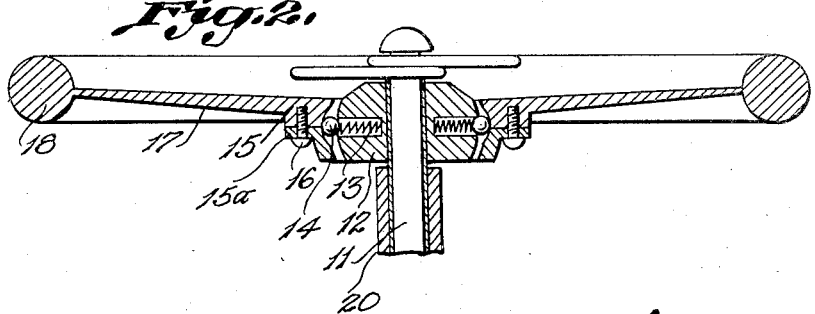
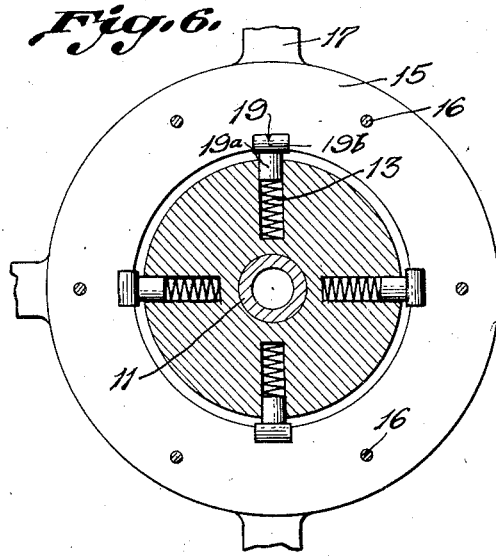
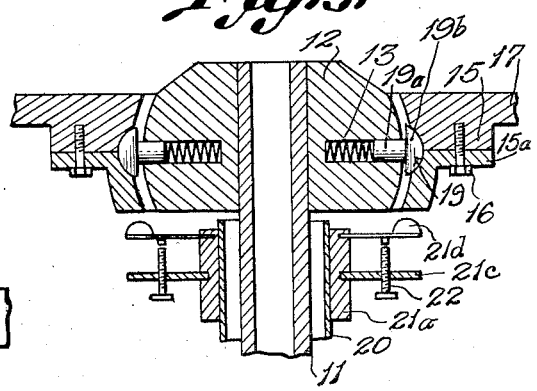

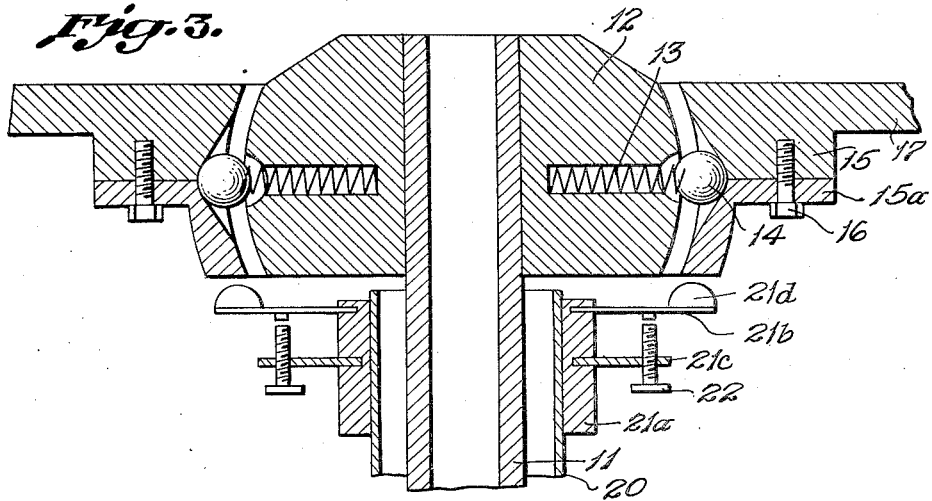
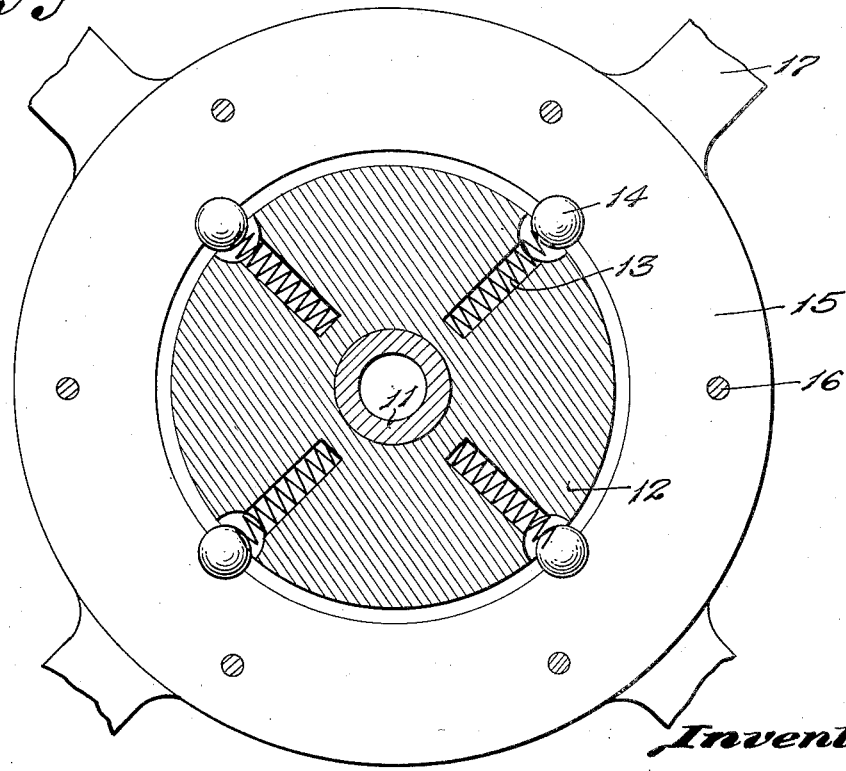

2,042,863

UNITED STATES PATENT OFFICE 2,042,863

CIRCUIT CLOSER

William Pitt, Brooklyn, N. Y.

Application December 1, 1931, Serial No. 578,327

3 Claims. (Cl. 200—59)

This invention relates to the combination of a steering wheel and a multiple pole switch.

Pursuant to my invention electrically operated signals and/or other auxiliaries of a self-propelled vehicle may be operated by the operator of the vehicle without taking either of his hands from the steering wheel.

In instances of use the above is accomplished by use of a steering wheel that is universally mounted on a hub that is fixed to its shaft in the usual manner, the steering wheel is held so that its axis and the axis of its hub are in line by spring pressure, and switch blades or other controlling means are operated by pressing on the rim of the steering wheel, which being universally mounted operates a switching mechanism as will be more fully understood from the following detail description and drawings, in which, Fig. 1 is a view of the steering wheel from above.

Fig. 2 is a cross sectional view of Fig. 1, the switching mechanism is not shown in Fig. 2.

Fig. 3 is an enlarged cross sectional view showing universal mounting and switch.

Fig. 4 is a cross sectional view of Fig. 3.

Fig. 5 is another form of universal mounting viewed the same as Fig. 3.

Fig. 6 is a cross sectional view of Fig. 5.

Referring to Figures 1, 2, 3, and 4 it will be seen that the steering wheel resembles the conventional steering wheel in appearance, 11 is the shaft, 12 is a hub mounted on shaft 11 and fixed thereto, the hub 12 has four cylindrical openings radially located at 90 degrees to each other in its periphery, the periphery of the hub 12 is in the form of an arc the axis of which is at 90 degrees to the axis of hub 12, in each of the four openings are the springs 13, which are held compressed by the balls 14, which mesh in the semicylindrical grooves of the hub 15 of the steering wheel, the grooves are parallel to the axis of the shaft 11 and are tapered from the center toward each end, hub 15 is formed in two pieces 15 and 15a held together by the bolts 16, hub 15, and spokes 17, and rim 18 are in one unit, the hub, 15 is formed so that it is a running fit over the hub 12.

Figs. 5 and 6, similar parts have similar index numbers as in Figs. 1, 2, 3, and 4. The departure of Figs. 5 and 6 from Figs. 3 and 4 is that the balls 14 are replaced by the pin-keys 19 which have cylindrical sections 19a engaged in cylindrical openings of hub 12 and semi-cylindrical section 19b engaged in the grooves of the steering wheel hub 15, the grooves in hub 15 are of oblong cross sections and taper from the center toward each end in depth.

Figs. 2, 3, and 5 the tubular casing 20, is the conventional type acting as a cover for the shaft 11 and in my invention casing 20 acts as a base to mount the switch 21, the switch 21 is comprised of the annular body 21a of suitable dielectric material in which the four spring blades 21b and the four contact arms 21c are mounted, adjustable contact screws 22 are threaded and are screwed in tapped holes in the contact arms 21c. The four spring blades 21b and the four contact arms 21c are radially disposed about the axis of the shaft 11, at 90 degree intervals. The spring arms 21b have dielectric buttons 21d to apply operating pressure. The clearances between the various parts shown in Figs. 1, 2, 3, 4 and 5, and 6 are much greater than practical application would permit, this is done to make the drawings clear and concise.

From the foregoing description of the various parts and their locations, it is obvious that the rim 18 of the steering wheel may be depressed at any point causing the axis of the steering wheel to change relative to the axis of the shaft 11, said change being toward the point of depression.

Referring to Figs. 1, 3, and 5 assume that the operator depresses the rim 18 at the point near the right hand spoke 17 causing the axis of the steering wheel to change relative to the axis of the shaft 11, toward the point of depression, the movement of the hub 15 will depress the spring arm 21b into contact with contact screw 22 mounted in the contact arm 21c thus closing the circuit, said circuit will open as soon as steering wheel axis is brought into line with the axis of shaft 11, said return of axes to alignment is accomplished automatically by the springs 13 pressing the balls 14 into the deepest part of the grooves in the hub 15 upon the cessation of pressure by the operator on the steering wheel rim.

Figs. 5 and 6, the balls 14 are replaced by the pin-keys 19, similar action takes place, the change in the axis of the steering wheel presses the pin-keys 19 toward the axis of the shaft 11 thru medium of the depth contour of the grooves in hub 15, thus compressing the springs 13 which tend upon reaction to press pin-keys 19 to the point of greatest depth, causing axial alignment of the steering wheel and shaft 11.

As an example we will assume that we have four electric circuits operated by varying the axis of the steering wheel, said circuits being controlled as follows:

1. Pressure to a point on the rim of the steering wheel at the right of the steering post causing signals by means of sign and/or, illumination to indicate that the operator intends to turn to the right.

2. Pressure at a point on the rim of the steering wheel at the left of the steering post causing similar indication of intention to turn left.

3. Pressure at a point on the rim of the steering wheel to the rear of the steering post causing signals to indicate intention of operator to stop or slow down.

4. Pressure at a point forward of steering post on rim of the steering wheel could operate horn or a headlight dimmer, or an indicator that would signal the following car operator to pass.

It is obvious that all four contacts could be made to operate the horn or relays controlling gear shifting and/or the clutch.

While I assume that four circuits would be most practical it is clear that a greater number might be feasible or a smaller number desirable.

It must be kept in mind that the switches may be located at other points than those mentioned, also that operating pressure is applied at a certain point regardless of the amount of steering wheel setting, that is the pressure is applied to a certain point whether the car is going in a straight line or in a circle.

I am aware that various attempts have been made to have a signal system operated by the driver of a motor vehicle but they do not provide for merely depressing the steering wheel rim at a given point relative to the steering wheel shaft regardless of the steering wheel setting thereby providing accurate selection of various signals without visual attention. There are also signals that operate when the wheels are turned, it is obvious that the person for whom the signal is intended will see the car turning as soon as the signal, thus it accomplishes nothing.

Many laws have been passed requiring signalling by the operator of a vehicle of his intention to turn or stop, so far the most satisfactory method has been the use of the operator's arm as a semaphore. The disadvantages of this method lie in the following: The operator must take one hand from the wheel when he needs it most to turn the car, or in the case of sudden stopping one hand is needed to steer and the other is needed to supplement the foot controlled brake with the hand controlled brake, and in the winter time with a closed car it is necessary to keep the window open thus sacrificing the advantage of a closed car. There is also confusion resulting from the different signals used. Regarding the present brake operated stop light it can also be said to be of little use also, because the brakes of a car are applied simultaneously with the signal, thereby leaving no provision for forewarning.

The advantages of my device are many; the operator merely depresses the wheel on the side in which he intends to turn, a natural action, thus he warns a following car of his intention to turn and the direction in which he intended to turn, a duplicate indicator on the front would warn an approaching car operator, also a traffic officer would be informed of the operator's intentions. All this is accomplished with the car windows closed and with both hands of the operator on the wheel.

Any type of universal joint would be applicable by the addition thereto of means to cause axial alignment of the steering wheel and its shaft upon cessation of operating pressure.

The switch 21 mounted on casing 20 may be made in many forms one of which the following is a description. The contactor arms 21c may be replaced with spring blades similar to the spring blades 21b and the contact adjustment accomplished by moving the whole switch 21 toward or away from the hub 15.

The wiring circuit for a device of this type is well known to the art as are the signal lamps and semaphores.

The universal excursion of the steering wheel is limited by the contour of the grooves in the hub 15.

Close fitting of the parts will eliminate all play.

Mechanical control means may be operated by the universal steering wheel.

Assembly and service are accomplished by merely removing bolts 16.

Suitable enclosing means may be used around the switch mechanism.

Whereas I have described my invention by reference to specific forms thereof, it will be understood that many changes and modifications may be made without departing from the spirit of the invention.

I claim:

1. A combination steering wheel and signalling device for automobiles and the like comprising a rotatably mounted shaft, a steering wheel, universal mounting means intermediate said shaft and said steering wheel, a switch disposed to operate by universal movement of said steering wheel, said universal mounting means including means to maintain axial alignment of said steering wheel and shaft, said alignment means including springs in cylindrical orifices, steel balls between said orifices and irregular grooves in steering wheel hub.

2. A steering wheel and signalling means for automobiles and the like combined in a single unit, comprising a steering movement conveying shaft, a hub member fixed thereto, said hub member including universal mounting for steering wheel, said universal mounting means including spring alignment means, radial cylindrical orifices in said hub, spring members located in cylindrical orifices, spherical members adjacent to said spring members, said spherical members engaging cylindrical orifices in hub and grooves in said steering wheel, said grooves being semi-circular in cross section and the depths of said grooves decreasing along the length from the center toward the ends, a switching mechanism mounted on a fixed member and disposed to be operable by universal excursion of said steering wheel.

3. A steering wheel and signalling means for automobiles and the like combined in a single unit comprising a steering movement conveying shaft, a hub member fixed thereto, said hub member including universal mounting means and spring alignment means for said steering wheel, said universal mounting means comprising radial cylindrical orifices in said hub, spring members located in said cylindrical orifices, cylindrical sections of pin-keys engaged in said cylindrical orifices and in contact with said spring members, semi-cylindrical sections of said pin-keys engaging grooves in said steering wheel, said grooves being of rectangular cross section, the depth of said grooves decreasing along the length from the center toward the ends, a switching mechanism mounted on a fixed member and so disposed as to be operable by the universal excursion of said steering wheel.

WILLIAM PITT.